(12) United States Patent
Semin

(10) Patent No.: US 9,310,875 B2
(45) Date of Patent: Apr. 12, 2016

(54) INSTRUCTION THAT SPECIFIES AN APPLICATION THREAD PERFORMANCE STATE

(75) Inventor: Andrey Semin, Feldkirchen/Munich (DE)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 13/997,659

(22) PCT Filed: Dec. 22, 2011

(86) PCT No.: PCT/US2011/067025
§ 371 (c)(1),
(2), (4) Date: Jun. 24, 2013

(87) PCT Pub. No.: WO2013/095570
PCT Pub. Date: Jun. 27, 2013

(65) Prior Publication Data
US 2014/0053009 A1    Feb. 20, 2014

(51) Int. Cl.
*G06F 1/32* (2006.01)
*G06F 9/30* (2006.01)
*G06F 9/38* (2006.01)

(52) U.S. Cl.
CPC .............. *G06F 1/324* (2013.01); *G06F 1/329* (2013.01); *G06F 1/3243* (2013.01); *G06F 9/3009* (2013.01); *G06F 9/30083* (2013.01); *G06F 9/3851* (2013.01); *Y02B 60/1239* (2013.01); *Y02B 60/144* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10

USPC .......................... 713/300, 310, 320, 322, 323
See application file for complete search history.

(56) References Cited

U.S. PATENT DOCUMENTS 6,671,795 B1    12/2003    Marr et al.
6,931,641 B1    8/2005    Davis et al.
6,948,034 B2    9/2005    Aoki (Continued)

FOREIGN PATENT DOCUMENTS

TW    2008/25706    6/2008
TW    2011/07957    3/2011
TW    2011/11978    3/2011

OTHER PUBLICATIONS

PCT "Notification of Transmittal of the International Search Report and the Written Opinion of the International Searching Authority, or the Declaration", Application No. PCT/US2011/067025, mailed Aug. 29, 2012, 11 pages.

(Continued)

*Primary Examiner* — Zahid Choudhury
(74) *Attorney, Agent, or Firm* — Nicholson De Vos Webster & Elliott, LLP

(57) ABSTRACT

An apparatus is described that includes a processor. The processor has a processing core to execute an instruction that specifies a performance state of an application thread. The instruction belongs to the application thread. The processor includes a register to store the performance state. The processor includes power management control logic coupled to the register to set a performance state of the processing core as a function of the performance state.

20 Claims, 6 Drawing Sheets

(56) References Cited

U.S. PATENT DOCUMENTS

| | | | |
|---|---|---|---|
| 7,257,679 B2 | 8/2007 | Clark | |
| 7,404,067 B2 | 7/2008 | Aamodt et al. | |
| 7,493,621 B2 | 2/2009 | Bradford et al. | |
| 7,617,499 B2 | 11/2009 | Bradford et al. | |
| 7,631,307 B2 | 12/2009 | Wang et al. | |
| 7,849,465 B2 | 12/2010 | Zou et al. | |
| 8,296,773 B2* | 10/2012 | Bose et al. | 718/105 |
| 8,719,819 B2 | 5/2014 | Wang et al. | |
| 2002/0007387 A1 | 1/2002 | Ginsberg | |
| 2002/0124237 A1 | 9/2002 | Sprunt et al. | |
| 2002/0144083 A1 | 10/2002 | Wang et al. | |
| 2003/0023663 A1 | 1/2003 | Thompson et al. | |
| 2003/0126186 A1 | 7/2003 | Rodgers et al. | |
| 2004/0008200 A1 | 1/2004 | Naegle et al. | |
| 2004/0107369 A1 | 6/2004 | Cooper et al. | |
| 2004/0128489 A1 | 7/2004 | Wang et al. | |
| 2004/0148491 A1 | 7/2004 | Damron | |
| 2005/0071438 A1 | 3/2005 | Liao et al. | |
| 2005/0125802 A1 | 6/2005 | Wang et al. | |
| 2005/0172292 A1 | 8/2005 | Yamada et al. | |
| 2006/0123251 A1* | 6/2006 | Nakajima et al. | 713/300 |
| 2006/0271765 A1 | 11/2006 | Tell et al. | |
| 2006/0288192 A1 | 12/2006 | Abernathy et al. | |
| 2007/0006231 A1 | 1/2007 | Wang et al. | |
| 2007/0124736 A1 | 5/2007 | Gabor et al. | |
| 2007/0198863 A1* | 8/2007 | Bose et al. | 713/300 |
| 2009/0216958 A1 | 8/2009 | Biles et al. | |
| 2009/0222654 A1* | 9/2009 | Hum et al. | 713/100 |
| 2010/0293401 A1* | 11/2010 | de Cesare | G06F 9/526 713/320 |
| 2011/0078469 A1* | 3/2011 | Therien | 713/320 |
| 2011/0099393 A1* | 4/2011 | Tran | 713/300 |
| 2012/0331310 A1* | 12/2012 | Burns et al. | 713/300 |
| 2013/0007475 A1* | 1/2013 | Ganesan et al. | 713/300 |

OTHER PUBLICATIONS

Office Action from Counterpart Taiwan Patent Application No. 101148360, Mailed Oct. 8, 2014, 8 pages.

PCT Notification Concerning Transmittal of International Preliminary Report on Patentability (Chapter I of the Patent Cooperation Treaty) for PCT Counterpart Application No. PCT/US2011/067025, 8 pages.

Boston University, "The Linux Kernel: Process Management", CS591, Spring 2001, 22 pages.

Nakajima, Jun, "Idle Using PNI Monitor/mwait", LWN.net, Eklektix, Inc., Jul. 8, 2003, 3 pages.

R.Chappell, et al. Simultaneous Subordinate Microthreading (SSMT). ISCA '99: Proceedings of the 26$^{th}$ Annual International Symposium on Computer Architecture, pp. 1-10, IEEE Computer Society, 1999.

Chi-Keung Luk, "Tolerating Memory Latency Through Software-Controlled Pre-Execution in Simultaneous Multithreading Processors", ISCA '01; Proceedings of the 28$^{th}$ Annual International Symposium on Computer Architecture, pp. 40-51, New York, NY, USA, 2001. ACM Press.

A. Roth, et al. "Speculative Data-Driven Multithreading" HPCA '01:Proceedings of the 7$^{th}$ International Symposium on High-Performance Computer Architecture (HPCA'01), p. 37, IEEE Computer Society, 2001.

J.G. Steffan, et al., "A Scalable Approach to Thread-Level Speculation", ISCA '00: Proceedings of the 27$^{th}$ Annual International Symposium on Computer Architecture, pp. 1-12, New York, NY, USA, 2000. ACM Press.

N. Tuck, et al., "Multithreaded Value Prediction", HPCA'05: Proceedings of the 11$^{th}$ International Conference on High Performance Computer Architecture, pp. 5-15. IEEE Computer Society, 2005.

S. Wallace, et al. "Threaded Multiple Path Execution", OSCA '98:Proceedings of the 25$^{th}$ Annual International Symposium on Computer Architecture, pp. 238-249 IEEE Computer Society, 1998.

Intel "64 and IA-32 Architectures Software Developer's Manual", Combined vols. 1, 2A,2B,2C,3A,3B and 3C, *vol. 2A—pp. 3-197 to 3-235, Dec. 2011.

Intel "64 and IA-32 Architectures Software Developer's Manual", Combined vols. 1, 2A,2B,2C,3A,3B and 3C, *vol. 2B—pp. 4-685 to 4-695, Dec. 2011.

Intel "64 and IA-32 Architectures Software Developer's Manual", Combined vols. 1, 2A,2B,2C,3A,3B and 3C, *vol. 3A—pp. 13-9 to 13-15, Dec. 2011.

Notice of Allowance with English translation from corresponding Taiwan Patent Application No. 101148360, mailed Mar. 10, 2015, 3 pages.

* cited by examiner

LOGIC BLOCK DEDICATED TO
A SINGLE THREAD

| THREAD PERFORMANCE STATE | SYSTEM EDICT SETTING | |
|---|---|---|
| | HIGH POWER PERFORMANCE | LOW POWER PERFORMANCE |
| HIGH | LL | HT |
| MEDIUM | HT | ET |
| LOW | ET | PO |

INSTRUCTION THAT SPECIFIES AN APPLICATION THREAD PERFORMANCE STATE

CROSS-REFERENCE TO RELATED APPLICATION

This patent application is a U.S. National Phase Application under 35 U.S.C. §371 of International Application No. PCT/US2011/067025, filed Dec. 22, 2011, entitled INSTRUCTION THAT SPECIFIES AN APPLICATION THREAD PERFORMANCE STATE.

BACKGROUND

1. Field of Invention

The present application is directed to the computing sciences generally, and, more specifically, to an instruction that specifies an application thread performance state.

2. Background

As the performance of processors has increased over the years, so too has their power consumption. Whether being "green energy" conscious, attempting to minimize battery draw, or simply trying to minimize their utility bills, customers of computing systems are increasingly focused on the power management capabilities of their internal processor(s). As such, most modern processors have built in power management circuitry. The built in power management circuitry typically is designed to make fine grained power management adjustments dynamically in hardware, and/or, support coarse grained power management adjustments/directives from software.

Generally, the power consumption of an electronic circuit can be controlled by any of three primary techniques: 1) frequency scaling; 2) clock gating; and, 3) voltage scaling. Each of these techniques take into account fundamental principles of the power consumption of an electronic circuit. Mainly, the faster an electronic circuit operates the greater its performance and power consumption will be. A review of each of these techniques is provided immediately below.

Frequency scaling is the adjustment of an operating frequency of a block of logic circuitry. Here, when higher performance is desired of the logic block at the expense of increasing its power consumption, the frequency of operation of the logic block is raised. Likewise, when lower power consumption is desired at the expense of lower performance the frequency of operation of the logic block is lowered. The size and function of the different logic blocks that are frequently scaled can vary depending on the designer's desired granularity.

Clock gating can be viewed as an extreme form of frequency scaling. In the case of clock gating, a clock signal to a block of logic is extinguished so as to reduce both the performance and power consumption of the block to zero. When the block of logic is to be used, the clock signal reemerges to bring the block of logic back to life. Clock gating therefore has the effect of enabling/disabling a block of logic.

Voltage scaling is like frequency scaling except that a power supply voltage is lowered/raised in order to lower/reduce a logic block's performance and power consumption. Notably, the higher the power supply voltage received by an electronic circuit, the higher the maximum clock frequency that can be applied to the logic block.

Processor cores have heretofore been designed with hardware control logic circuitry that can quickly and dynamically adjust frequency scaling, clock gating and/or voltage scaling settings to small, medium and/or large logic blocks of a processor chip in response to detected usage of the processor chip. For example, a floating point execution unit in a pipeline might be disabled/enabled via clock gating depending on whether there are any floating point instructions in an instruction queue. Here, because hardware control can quickly adjust the power management setting of small or medium sized logic blocks, hardware power management control is understood to be capable of "fine grained" control.

That having been said, frequency and voltage scaling are understood to have undesirable latencies associated with their respective state transitions. That is, even if hardware frequency and/or voltage scaling control logic can quickly make a decision that a frequency and/or voltage needs to be changed, implementing the change itself wastes time because, generally, frequency of operation and/or supply voltage of an electronic logic circuit cannot be changed quickly on operational logic without risk of data corruption. Clock gating of medium to large size logic blocks also tend to have similar undesirable latencies when switching between enabled/disabled states. For instance, if an entire processor core is disabled, it generally cannot be brought back to life on a "next" clock cycle.

In this respect it is worthwhile to note that hardware power management control is reactive in that it can only react to the usage of the processor that it observes. The reactive nature of hardware control leads to performance hits or workload imbalances, owing at least partially to the latencies between power management state changes discussed just above, when observed usage of the processor dramatically changes. For instance, if a large multi-core processor is sitting in a low power state with multiple cores having been disabled because of low utilization, and suddenly the processor is presented with a large number of threads for execution, many of the newly presented threads have to undesirably "wait" for cores to be enabled before they can execute.

Some run-time compilers (e.g., OpenMP and MPI) and operating system (OS) schedulers can, however, provide hints to the hardware of upcoming processor usage. With such hints the hardware can prepare itself in advance for upcoming usage changes and, in so doing, ideally avoid performance hits or workload imbalances by beginning to change performance state before the change in usage is actually presented.

With respect to software power management control, software power management control is understood to be mostly if not entirely "coarse grained". That is, software power management control typically affects medium to large sized logic blocks and, moreover, software controlled power management settings are not rapidly changed (rather they persist for extended periods of time). As such, to the extent the processor hardware provides software writable control fields or other "hooks" to assist software power management, such fields/hooks do not directly implement any fine grained control.

In addition, many existing software power management control mechanisms rely on or effectively merely oversee a specific hardware implementation of power management, such as the P-states of specific processors. As such, true software power management techniques are less portable across different hardware implementations.

The best known possible exception to this perspective is a PAUSE instruction which is an instruction that causes the thread that executes the instruction to be put into a sleep state.

BRIEF DESCRIPTION OF THE DRAWINGS

The present invention is illustrated by way of example and not limitation in the figures of the accompanying drawings, in which like references indicate similar elements and in which:

FIGS. 2a and 2b pertain to logic block performance states of said processor;

DETAILED DESCRIPTION

Overview

Figure 1:
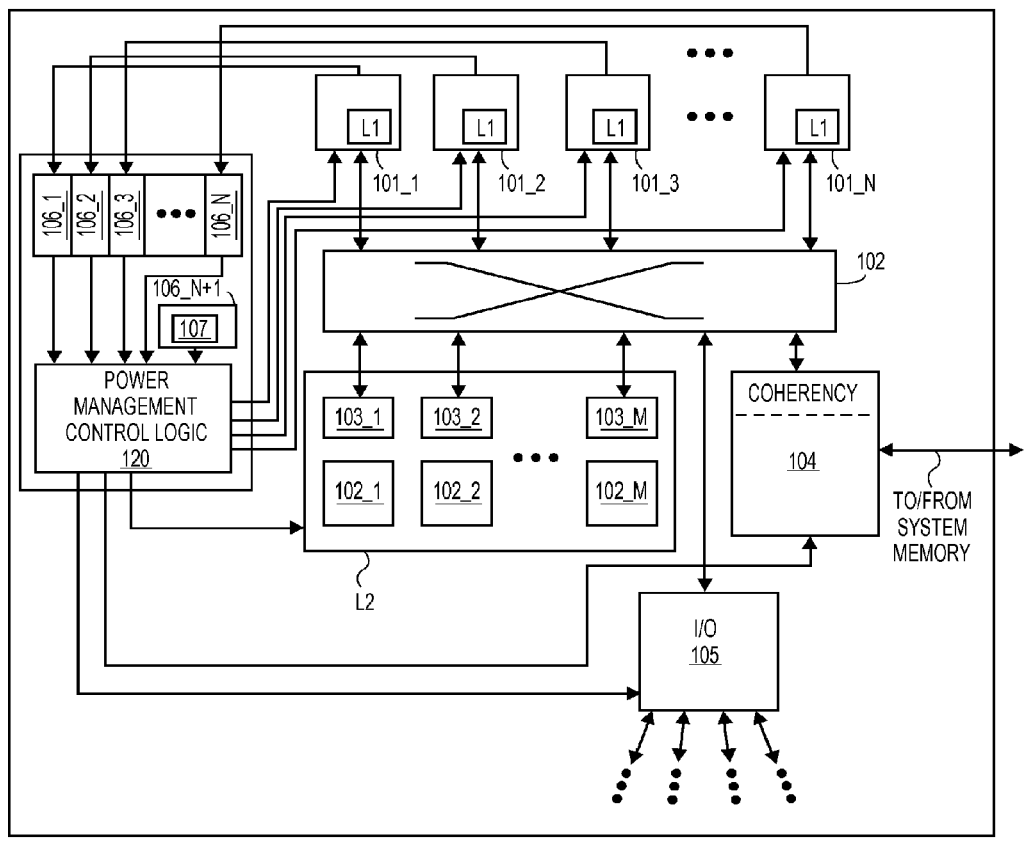
FIG. 1 shows a processor.

Described herein is a special instruction, TCMHINT, that can be imposed by application software developers to control power management of their application in a fined grained manner through software. Specifically, the instruction described herein, and the processor architecture designed to support it, permit application software developers to label each thread of their application with one of a plurality of performance states. The per thread performance state label is used by the underlying processor to properly set-up the performance/power consumption characteristics of the processor consistent with the application software developer's desires. At the same time the instruction does not rely on any specific implementation of power management technology or a processor architecture in hardware, which makes this instruction use portable to other architectures and allows best implementation of the instruction for any future possible processor and system architectures.

Moreover, the TCMHINT instruction can be embedded as a hint in advance of an upcoming change to program flow structure/behavior to "set up" the processor's performance/power consumption characteristics in advance of the change. As such, performance or workload imbalances caused by the time needed to transition the processor from a first performance/power state to another performance/power state can be avoided. (As the power that a processor may consume is correlated to its performance capabilities, hereinafter, the term "performance state" will be used to refer any power management setting that affects a processor's performance capabilities or power consumption.)

Here, application software developers are apt to understand the flow or "structure" of their application programs, the performance and power consumption implications of the same, and, which side of the high performance vs. low power consumption design point an entire application, or different sections of an application, should fall on. According to one embodiment, threads can be labeled according to one of three different performance states: 1) high performance (high power consumption)—e.g., a state where one or a few labeled threads are demanding the highest possible performance, such as in a serial part of an application (e.g. the servicing of an TO transaction): the hardware implementation can allow providing the highest possible performance to the single thread thus reducing "latency" of the thread execution; 2) medium performance (medium power consumption)—e.g., a state where the best overall performance will be achieved by concurrent execution of many threads, and thus the performance of each thread may be reduced (relative to the high performance state), while the overall application performance is improved based on a higher computational throughput delivered by multiple threads; 3) low performance (low power consumption)—e.g., a state where thread execution can be be optimized by the hardware to improve overall power consumption, even at the expense of further reducing the performance delivered by the thread.

To elaborate further, a software developer typically knows the characteristics of his/her threaded application, and is able to say whether a certain part of the application will be implemented with serial algorithms or highly parallelizable algorithms. Some algorithms are serial by nature (e.g. sorting linked list stored in some complex structures, or arbitrating IO communication) and thus a developer may flag that this single process needs a lot/most of the processor resources (including its power budget) to deliver the best performance and lowest computational time (latency) for a thread's instruction stream. The processor will recognize that threads will be running in low concurrency mode, and take appropriate actions to readjust its resources to deliver better performance for a few threads (such as kick-in Turbo frequency in advance to a higher level)

By contrast, other parts of the application can be known as substantially parallel (such as processing large arrays of regularly structured data in memory, or doing work in multiple threads which work on completely independent datasets) and thus can be implemented using many concurrent threads competing far the processor resources. This can be flagged by the developer (or also by compiler or by threading run-time) and hardware can take proper action distributing resources (such as power budget) across multiple cores and take other necessary actions to concurrently execute many threads. As such, a more uniform distribution of the resources between the processor cores and other blocks may result.

Further still, the thread may do some low priority work (e.g., am antivirus routine scan thread running in the background), so that its performance can be even further sacrificed if the system is biased towards the lowest power.

Moreover, the processor hardware is designed with an understanding of which resources of the processor are dedicated to a single thread and which resources of the processor are designed to support multiple threads. In an embodiment, those portions of the processor that are designed to support a single thread are placed in a performance state that is dictated by the most recent TCMHINT instruction executed by that thread. By contrast, those portions of the processor designed to support multiple threads take into account the performance state of all the threads its supports, and, based on that perspective places itself into an appropriate performance state.

In an even further embodiment, a "system edict" power management directive is entered into the processor through software that can effect both of the settings described above (single thread dedicated resource and multiple thread dedicated resource).

FIG. 1 shows a basic example. FIG. 1 depicts a multi-core processor 100 having multiple processing cores 101_1 to 101_N and an L1 cache. A crossbar switch 102 interconnects the processing cores 101_1 to 101_N and an L2 cache consisting of separate L2 cache slices 102_1 to 102_N and corresponding coherency protocol agents 103_1 to 103_N. The multi-processor core further includes a memory controller with associated coherency protocol agent logic 104 and an I/O hub 105. Logic circuitry disposed on a same semiconductor chip can be used to implement each of these logic blocks. In a basic embodiment, each processing core is dedicated to a single thread, whereas, as long as two or more processing cores are active, all other logic blocks observed in FIG. 1 are dedicated to multiple threads.

As observed in FIG. 1 register space 106 of the processor 100 is used to hold the performance state for the individual threads 106_1 to 106_N provided by their respective application software program, and, the aforementioned system edict power management directive 106_N+1. In an embodiment, the different logic blocks 101-105 of the processor are each capable of four different power states: 1) Low Latency (LL); 2) High Throughput (HT); 3) Efficient Throughput (ET); and, 4) Power Optimized (PO). A more thorough description of possible embodiments of these power states is described more fully below.

Presently, they can generally be viewed as four degrees of granularity as to a specific performance and power consumption setting. Here, the LL setting is the highest performance state, the HT state is the next highest performance state, the ET state is the second lowest performance state, PO is the lowest performance state. Here, for any logic block, a higher performance state generally corresponds to a total combination of operational frequency, clock gating and/or supply voltage settings, applied by power management control logic circuitry 120, that correspond to higher performance and power consumption for that logic block than any of its lower performance state options. Note that power management control logic circuitry 120 can be centralized as observed in FIG. 1, distributed, or some combination of the two approaches. In an embodiment, each thread executes its own TCMHINT instruction from time to time which establishes the performance state for the thread until the next TCMHINT instruction that is executed by the thread. As such, register space 106_1 to 106_N is respectively coupled to each of the N pipelines in the processor 100. When a pipeline executes a TCMHINT instruction as part of its execution of thread, the performance state of the thread as specified by the TCMHINT instruction is written into the pipeline's respective register.

In an embodiment, each pipeline has as many registers reserved for it in register space as the number of threads it can concurrently execute. For example, if a pipeline can concurrently execute four threads, there are four different register locations in register space 106 to hold the power setting from the most recent TCMHINT instruction for each of its (up to) four concurrent threads. Note that some processing cores may have more than one pipeline. For example, a processing core having two pipelines will have eight respective register locations in register space. Some processors or pipelines may have a pool of threads assigned to it that is greater than the number of threads it can concurrently execute. For example a pipeline that can concurrently execute four threads may have a pool of eight or sixteen threads assigned to it (to enable the processor to multi-task multiple threads/applications in real time). In this case, the pipeline switches back and forth between activating and executing a thread and parking it back to the pool in favor of activating another thread from the pool. In this case, register space 106 may be expanded to include not only the power state of its concurrently executing threads but also those in its pool. In this case, the pipeline can be viewed as a shared logic block that supports all the threads in its pool. Shared logic blocks and their appropriate power state are described in more detail further below with respect to FIG. 2b.

Figure 2B:
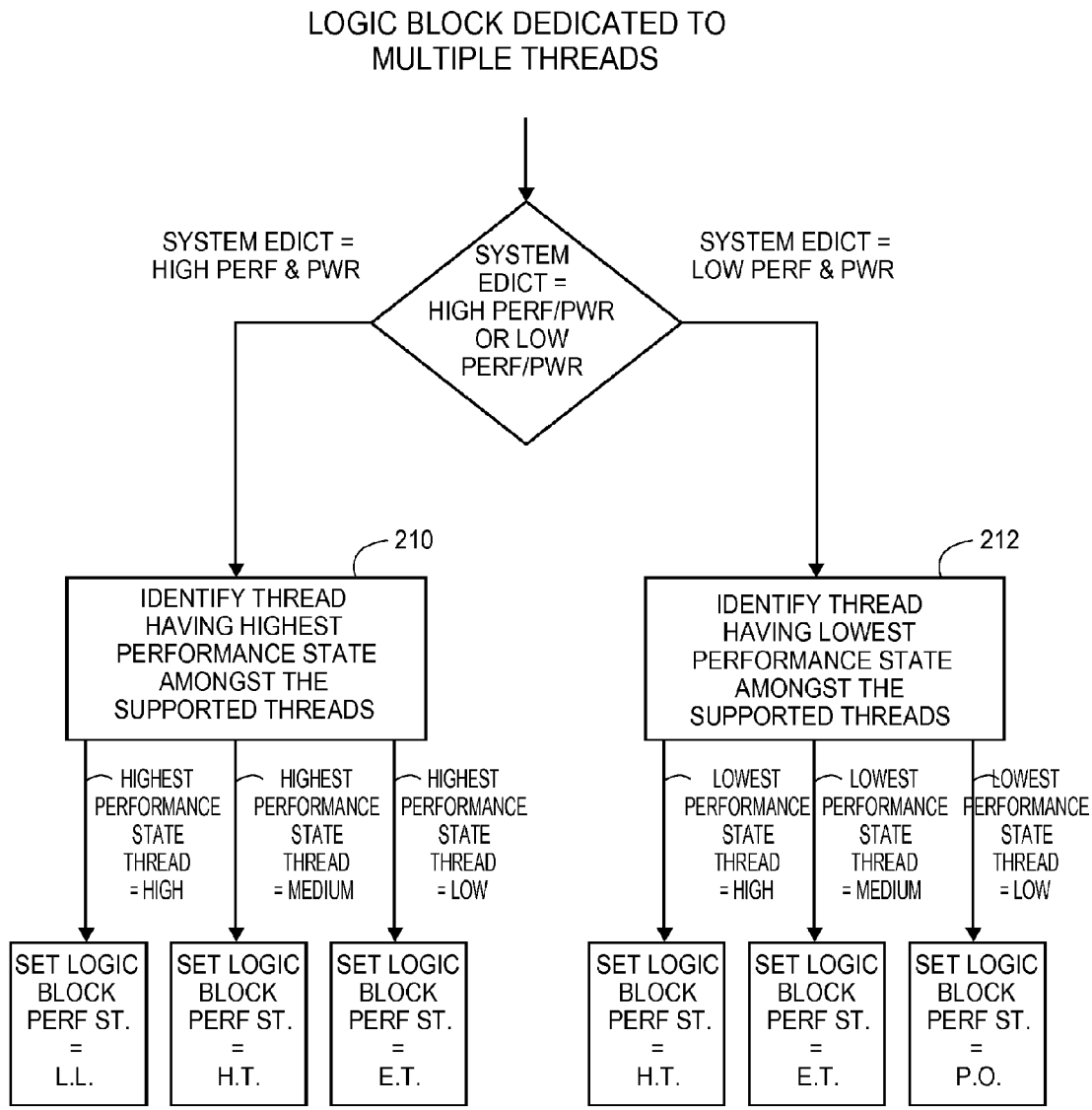

As observed in FIGS. 2a and 2b, the value 107 of the system edict power management directive in register 106_N+1 affects which of these states is chosen for those blocks dedicated to a single thread (FIG. 2a) and those blocks dedicated to multiple threads (FIG. 2b). The system edict directive 107 is essentially a global setting that dictates whether the processor as a whole is to be biased more toward higher performance (such as in servers or high performance workstations) or lower power consumption (such as in mobile platforms running from a battery).

Specifically, FIG. 2a shows the applicable settings for a resource (logic block) that is dedicated to a single thread (such as a processing core in the simple aforementioned example). As observed in FIG. 2a, when the system edict directive specifies higher performance: 1) if the logic block's thread is stated to be in the high performance state through a TCMHINT instruction, the logic block is placed in the LL state 201; 2) if the logic block's thread is stated to be in the medium performance state through a TCMHINT instruction, the logic block is placed in the HT state 202; and, 3) if the logic block's thread is stated to be in the low performance state through a TCMHINT instruction, the logic block is placed in the ET state 203.

By contrast, if the system edict directive specifies lower power: 1) if the logic block's thread is stated to be in the high performance state through a TCMHINT instruction, the logic block is placed in the HT state 204; 2) if the logic block's thread is stated to be in the medium performance state through a TCMHINT instruction, the logic block is placed in the ET state 205; and, 3) if the logic block's thread is stated to be in the low performance state through a TCMHINT instruction, the logic block is placed in the PO state 206.

Thus, regardless of the system edict setting 207, the performance state of a logic block dedicated to a single thread will scale commensurate with the most recent TCMHINT instruction executed for the thread. For a same TCMHINT instruction setting, however, the performance state of the logic block scales lower if the system edict value 207 indicates lower power consumption is desired. Contrarily, for a same TCMHINT instruction setting, the performance state of the logic block scales higher if the system edict value 207 indicates higher performance is desired even at the expense of higher overall power consumption of the processor.

FIG. 2b shows the applicable settings for a resource/logic block that is dedicated to the support of multiple threads. As observed in FIG. 2b, if the system edict directive 207 specifies higher performance/power, the shared block identifies the thread amongst all the threads that the logic block supports having the highest power TCMHINT instruction setting 210, and, accepts that thread as the model thread for all the threads the logic block supports. The shared logic block then enters a performance state according to strategy 211 outlined in FIG. 2a. That is, if the model thread identified at step 210 is a high performance thread, the shared logic block enters the LL state, etc.

By contrast, if the system edict directive 207 specifies lower performance and lower power, the shared block identifies the lowest power ranking of the threads that the shared logic block supports 212 and accepts that thread as the model thread for the threads. The shared logic block then enters a performance state according to strategy 213 outlined in FIG. 2a. That is, if the model thread identified at step 212 is a high performance thread, the shared logic block enters the HT state, etc.

The above scheme can be applied to any processor architecture regardless as to what specific blocks of the processor are dedicated to a specific thread and which blocks are dedicated to service multiple threads. Note that the set of threads that are supported by a shared logic block may change from logic block to logic block within a processor. For example, consider a processor architecture similar to that of FIG. 1 except that each processing core is a "dual pipeline" core where each pipeline is dedicated to a single thread. In this case each processor is a shared block that is dedicated to two threads, each thread pair being different for each processor core. By contrast, the crossbar, L2 cache, memory controller and 110 controller are shared logic blocks that service the set of all the threads of all the processing cores.

Thus, for example, if the system edict value 101 dictates high performance, if processor core 101_1 has two high performance threads it will be in the LL state, while, at the same time, if processor core 101_2 has two low performance threads it will be in the ET state.

With an understanding then of an embodiment of the hardware design that may be implemented to utilize the TCM-HINT instruction and a system edict value, it is worthwhile to discuss some uses of the TCMHINT instruction to affect power management of an application. Here, again, it is envisioned that the application software—rather than a compiler or OS Scheduler—directly imposes hints or power management directives to the hardware through the TCMHINT instruction. The system edict 107 can be supplied by the same application software, or, system level software such as the operating system or system power management software.

Figure 3:
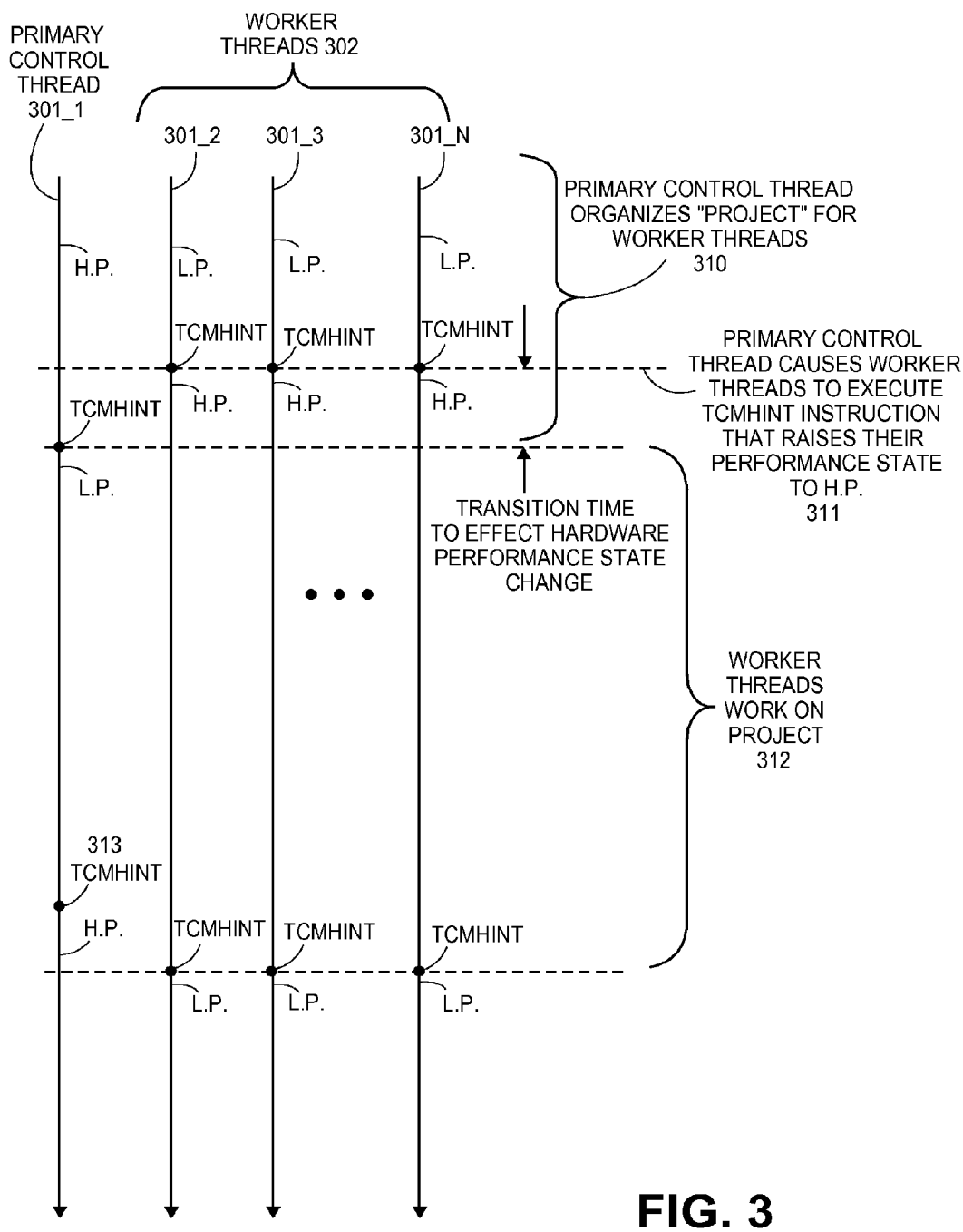
FIG. 3 shows the structural flow of a multi-threaded application that makes use of per thread TCMHINT instructions to control said application's power consumption.

FIG. 3 shows a first application flow structure that initially consists of a serial single thread, then, fans out to include multiple parallel threads, then, collapses back to a single thread. The application flow structure of FIG. 3 is typical for a "batch" computing application that has a primary control thread 301_1 that initially organizes a "project" 310 to be worked on in parallel by multiple "worker" threads 302_2 to 302_N. While the primary thread 301_1 is organizing the project 310, the primary thread 301_1 is in the high performance state (having been placed there by a TCMHINT instruction executed earlier by the primary thread). At the same time, the worker threads 302_2 to 302_N, not having any work to do at the moment, are in the low performance state (having also been placed there by an earlier TCMHINT instruction for each of them).

As the primary control thread 301_1 recognizes that the hand-off of work to the worker threads 301_2 to 301_N is near imminent, through an inter thread communication process, it causes the worker threads to execute their own respective TCMHINT instruction that specifies a high performance state for each of them 303. Here, the inter thread communication is made sufficiently in advance of the start of the actual work 305 performed by the worker threads 302_2 to 302_N to account for any transition time 304 needed to change the frequency, clock-gating and/or voltage settings of the hardware resources that support the worker threads 302_2 to 302_N. To be more precise, when the TCMHINT instructions are executed for the worker threads, a new value will be written into register space 106 for each of the threads. The upgrade to a higher performance state for the threads may trigger power management circuitry to change the power state of one or more pipelines, processors or other logic blocks consistent with the discussions provided above.

With the hardware prepared in advance for the work to be done by the worker threads, the "project" is dispatched from the primary control thread 301_1 to the worker threads 301_2 to 301_N and the worker threads begin their work on the project 305. Commensurate with the worker threads beginning their work on the project, the primary control thread 301_1 may execute a TCMHINT instruction to place itself in a low power state. The hardware may react accordingly.

With completion of the project by the worker threads appearing imminent (e.g., because a plurality of worker threads have signified near completion of their portion of the project), the primary control thread 301_1 executes another TCMHINT instruction to place itself into a high performance state 306. Again, the TCMHINT instruction is executed 306 sufficiently in advance of the actual completion of the project 307 by the worker threads 301_2 to 301_N so that power management control logic 120 can raise the performance state of any logic blocks that support the primary control thread 301_1 if circumstances warrant (e.g., according to the state change algorithms of FIGS. 2a and 2b).

When the worker threads 301_2 to 302_N have completed their work 307, the primary control thread 301_1 processes the results with its underlying hardware already in a higher performance state if appropriate. Each of the worker threads 301_2 to 302_N then execute another TCMHINT instruction to reset their performance state to low performance state. Their underlying supportive logic blocks re-adjust themselves if/as appropriate.

In the above example, the worker threads 302_2 to 302_N were placed in a high performance state to perform the project. Recall that in an embodiment, a thread can be assigned one of three performance states: 1) high; 2) medium; 3) low. The large scale parallel operation of the worker threads 302_2 to 302_N is actually a good example of where the medium thread power state might be used. Specifically, if all the worker threads 302_2 to 302_N were placed in the high performance state to perform the project as discussed in the example above, although the project might be completed in a minimum amount of time, the power consumption of the processor may exceed the application developer's wishes.

As such, in an alternate embodiment, rather than use the TCMHINT instruction to place each of the worker threads 302_2 to 302_N in a high performance state, the TCMHINT instruction is used to place each of the worker threads 302_2 to 302_N in a medium performance state. Here, with the project being a potentially massive parallel operation, the application developer can choose to consume more time completing the project in order to keep the power consumption of the processor limited while the project is being worked on. The choice is up to the developer depending on the circumstance of the application.

For example, a "mission critical" project may utilize high performance worker thread settings, while, a "lower importance" project may utilize medium performance worker thread settings. Moreover, as observed in FIGS. 2a and 2b, the system edict setting permits an even further degree to which the performance vs. power consumption trade off may be managed by an application developer or system administrator.

Note that although it is possible to execute each of the threads on its own processing core or pipeline there is no requirement to do so. If multiple worker threads are executed on a same processing core or same pipeline, the processing core's or pipeline' performance state will still be affected similarly/identically since the worker threads adjust their performance state identically and unison. If one or more worker threads are executed on the same processing core or pipeline that the primary control thread is executed on, the processing core or pipeline will either remain in a high performance state if the system edict dictates high performance or remain in a low performance state if the system edict dictates low performance because the primary control thread and worker threads toggle to opposite states of one another.

Figure 4:
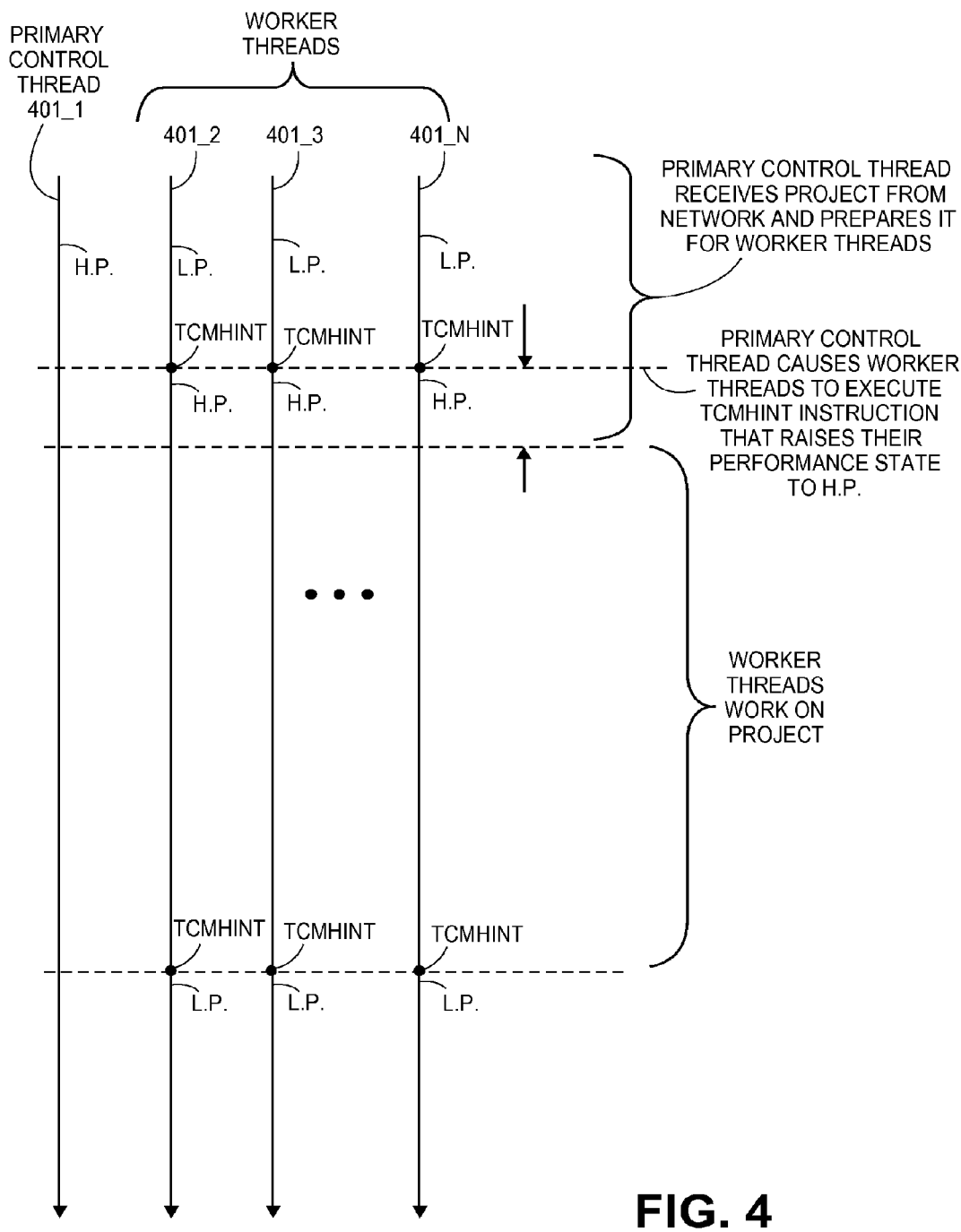
FIG. 4 shows the structural flow of a second multi-threaded application that makes use of per thread TCMHINT instructions to control said second application's power consumption.

In another example, observed in FIG. 4, another multi-threaded application is observed. Thread 401_1 can again be viewed as a control thread and threads 402_2 to 402_N again can be viewed as worker threads. However, the "project" that is worked on by worker threads 402_2 to 402_N is received from a network that the system on which the application executes is coupled to. Control thread 401_1 is a thread that handles incoming traffic from the network. Thus, before the worker threads can work on a project received from the network, the "project" is first received from the network by control thread 401_1.

In this case, control thread 401_1 may be permanently set in a high performance state (e.g., by a single TCMHINT instruction executed at the beginning of the thread). As such, the control thread 401_1 can receive and process the project as quickly as possible as soon as it arrives. Part of the processing may include using an inter thread communication to "wake up" the worker threads 302_2 to 302_N as soon as the project arrives from the network by causing them to execute a TCMHINT instruction that changes their current low power idle setting to a higher power setting. The higher power setting may be a medium performance state or a high performance state depending again on the overall environment (importance of project, power budget, etc.).

Note that the inter thread communication from a control thread to the worker threads can be nothing more than a function call to the worker threads where the function called upon includes a TCMHINT instruction with the desired change in thread power state.

Figure 5:
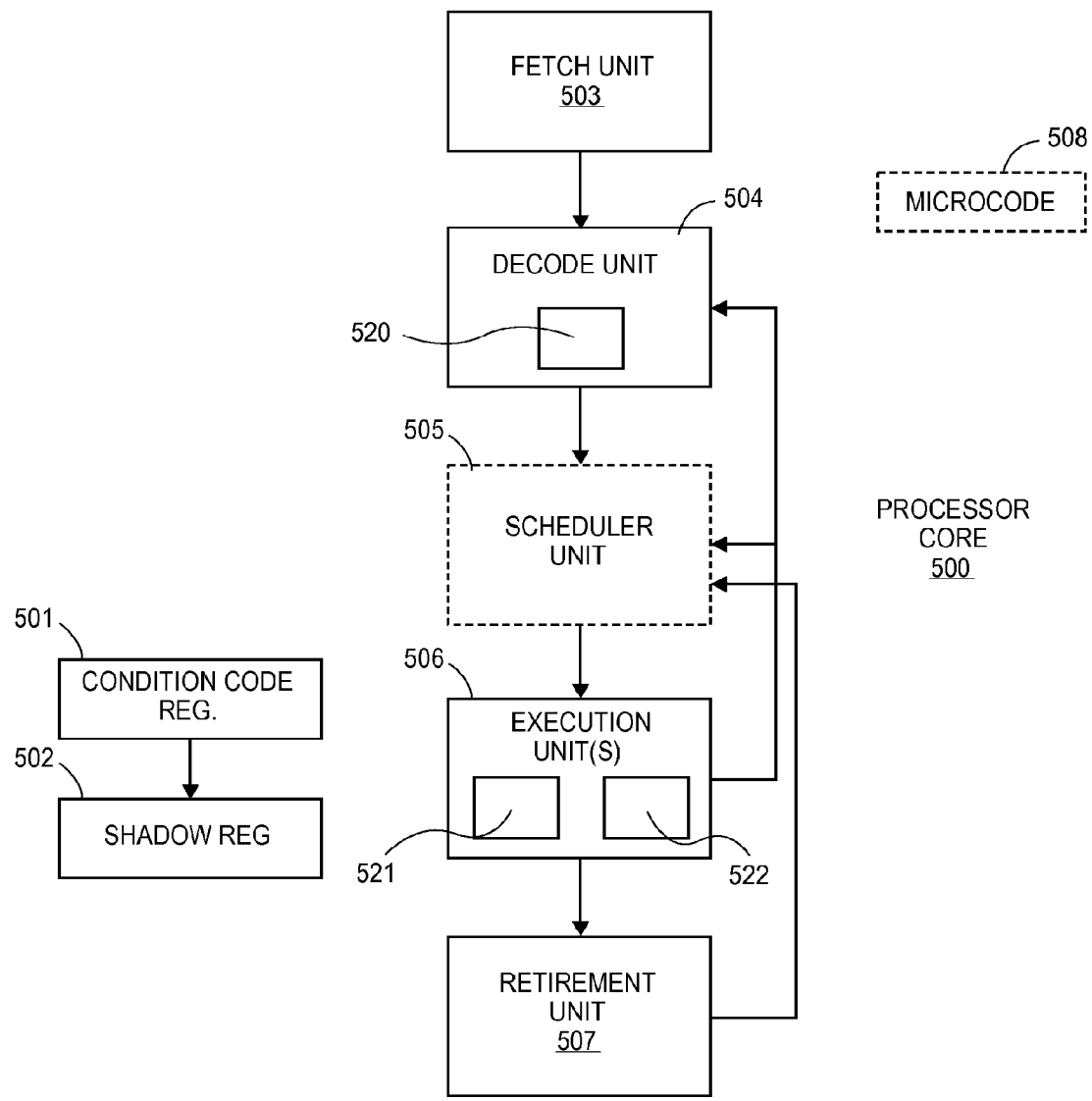
FIG. 5 shows an embodiment of an instruction execution pipeline.

FIG. 5 shows a generic processing core 500 that is believed to describe many different types of processing core architectures such as Complex Instruction Set (CISC), Reduced Instruction Set (RISC) and Very Long Instruction Word (VLIW). The generic processing core 500 of FIG. 5 includes an instruction execution pipeline having: 1) a fetch unit 503 that fetches instructions (e.g., from cache or memory); 2) a decode unit 504 that decodes instructions; 3) a schedule unit 505 that determines the timing and/or order of instruction issuance to the execution units 506 (notably the scheduler is optional); 4) execution units 506 that execute the instructions; 5) a retirement unit 507 that signifies successful completion of an instruction. Notably, the processing core may or may not include microcode 508, partially or wholly, to control the micro operations of the execution units 506. The instruction execution resources/logic referred to in pre-ceding discussions may be implemented with one or more of the execution units within execution units 506.

Here, specifically, the execution unit(s) that execute the TCMHINT instruction described herein may be coupled to register space that is read by power management control logic to affect the performance state settings of various logic blocks within a processor that includes the processing core of FIG. 5. In executing the TCMHINT instruction, the performance state information included with the instruction (e.g., "X" in an instruction format of the form "TCMHINT X") is written to such register space.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims.

What is claimed is:

1. An apparatus, comprising:
   a processor having:
   a processing core to execute an instruction that specifies a performance state of an application thread, said instruction belonging to said application thread;
   a first register to store said performance state;
   a second register to store a system edict value to indicate whether the processor is biased toward higher performance and higher power consumption or lower performance and lower power consumption; and
   power management control logic coupled to the first register and the second register to set a performance state of the processing core as a function of said performance state of said application thread and said system edict value.

2. The apparatus of claim 1 wherein said processor supports multiple performance states, and, said performance state of said processing core, if said system edict value indicates a bias toward higher performance and power consumption, is a next performance state higher than if said system edict value indicated a bias toward lower performance and lower power consumption.

3. The apparatus of claim 2 wherein said processor is a shared logic block that supports multiple application threads and corresponding performance states thereof.

4. The apparatus of claim 3 wherein said performance state of said processor is a function of said performance state of said application thread because said performance state of said application thread is a highest performance state amongst said multiple application threads, and said system edict value indicates a bias toward higher performance and higher power consumption.

5. The apparatus of claim 3 wherein said performance state of said processor is a function of said performance state of said application thread because said performance state of said application thread is a lowest performance state amongst said multiple application threads, and said system edict value indicates a bias toward lower performance and lower power consumption.

6. The apparatus of claim 1 wherein said performance state of said processing core is a performance state of a pipeline within said processing core, said instruction executed by said pipeline.

7. A method, comprising:
 executing on a processing core of a processor an instruction that specifies a performance state of a thread of an application, said instruction belonging to said thread;
 writing said performance state of said thread to register space;
 providing a system edict value that indicates whether the processor is biased toward higher performance and higher power consumption or lower performance and lower power consumption;
 accessing said performance state of said thread from said register space; and
 changing a performance state of said processing core consistent with said performance state as a function of said performance state of said thread and said system edict value.

8. The method of claim 7 wherein said instruction is executed by a pipeline and said performance state of said processing core is a performance state of said pipeline.

9. The method of claim 7 further comprising determining said changing with power control logic circuitry.

10. The method of claim 9 further comprising said power control logic circuitry taking into account the system edict value when performing said determining.

11. The method of claim 10 further comprising said power control logic circuitry taking into account respective performance states of other application threads executed by said processor when performing said changing.

12. The method of claim 7 further comprising taking account of said performance state of said thread and respective performance states of other threads when determining a performance state of a logic block other than said processing core that supports said thread and said other threads, wherein said logic block and said processing core are on a same semiconductor chip.

13. The method of claim 12 wherein said logic block is any of:
 an L2 cache;
 a system memory controller;
 an I/O hub; and
 an integrated special purpose computational block.

14. A non-transitory machine readable medium containing program code that when processed by a processor causes a method to be performed, said method comprising:
 executing on a processing core of the processor an instruction that specifies a performance state of a thread of an application, said instruction belonging to said thread;
 writing said performance state of said thread to register space;
 providing a system edict value that indicates whether the processor is biased toward higher performance and higher power consumption or lower performance and lower power consumption;
 accessing said performance state of said thread from said register space; and
 changing a performance state of said processing core consistent with said performance state as a function of said performance state of said thread and said system edict value.

15. The non-transitory machine readable medium of claim 14, wherein said instruction is executed by a pipeline and said performance state of said processing core is a performance state of said pipeline.

16. The non-transitory machine readable medium of claim 14, wherein the method further comprises determining said changing with power control logic circuitry.

17. The non-transitory machine readable medium of claim 16, wherein the method further comprises said power control logic circuitry taking into account the system edict value when performing said determining.

18. The non-transitory machine readable medium of claim 17, wherein the method further comprises said power control logic circuitry taking into account respective performance states of other application threads executed by said processor when performing said changing.

19. The non-transitory machine readable medium of claim 14, wherein the method further comprises taking account of said performance state of said thread and respective performance states of other threads when determining a performance state of a logic block other than said processing core that supports said thread and said other threads, wherein said logic block and said processing core are on a same semiconductor chip.

20. The apparatus of claim 1, wherein the power management control logic coupled to the first register and the second register is to set the performance state of the processing core as a function of a performance state of a plurality of application threads and said system edict value.

* * * * *